June 22, 1965     E. J. TESTA     3,190,666
HOLDER AND JAW INSERTS COMPRISING THE TOP JAW FOR A CHUCK
Filed Aug. 6, 1963     3 Sheets-Sheet 1

INVENTOR.
ERNEST J. TESTA
BY
Fowler & Knobbe
ATTORNEYS.

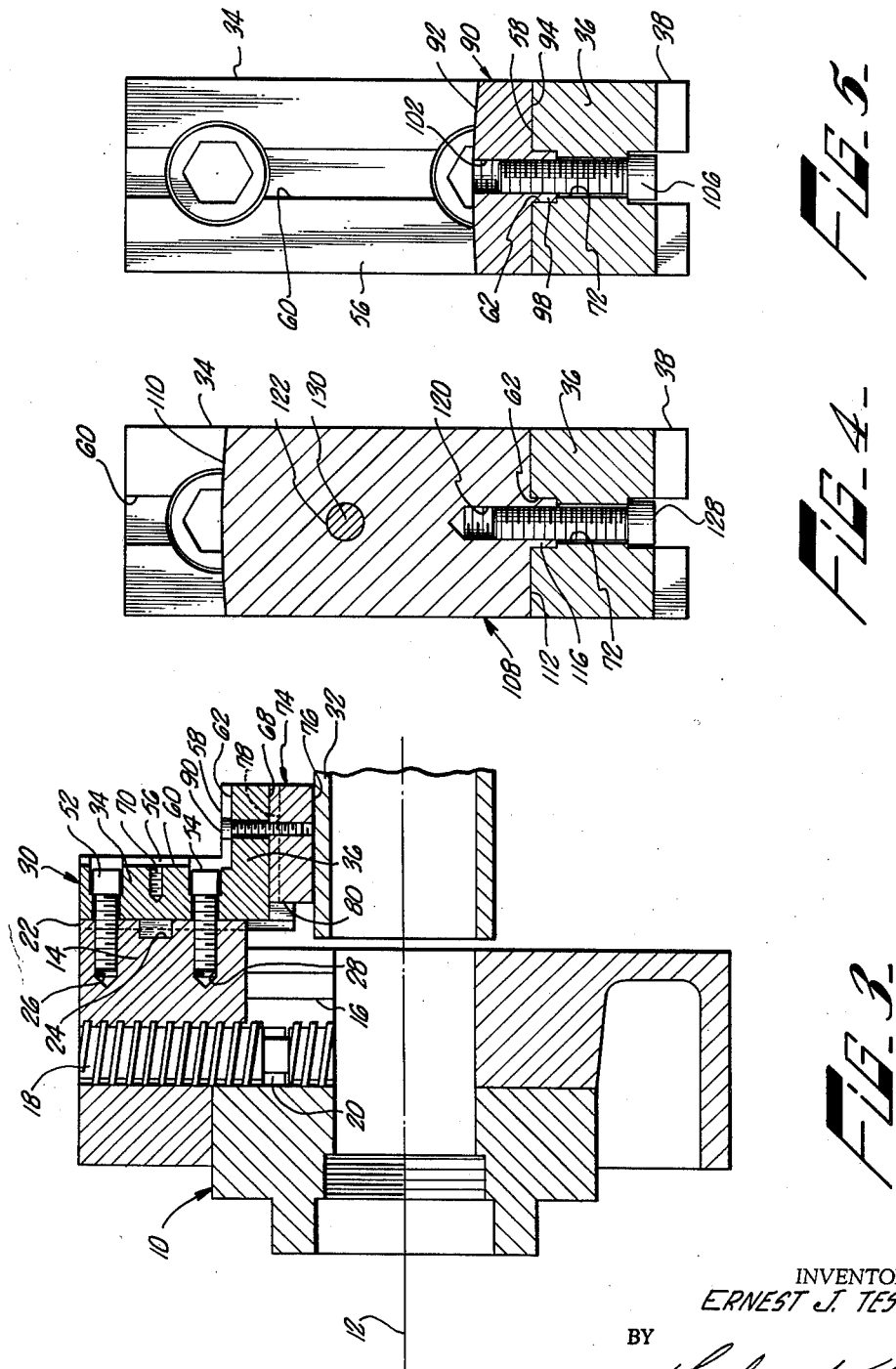

June 22, 1965       E. J. TESTA       3,190,666
HOLDER AND JAW INSERTS COMPRISING THE TOP JAW FOR A CHUCK
Filed Aug. 6, 1963                           3 Sheets-Sheet 3
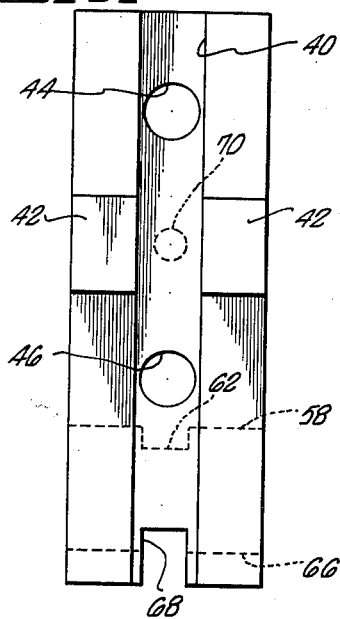
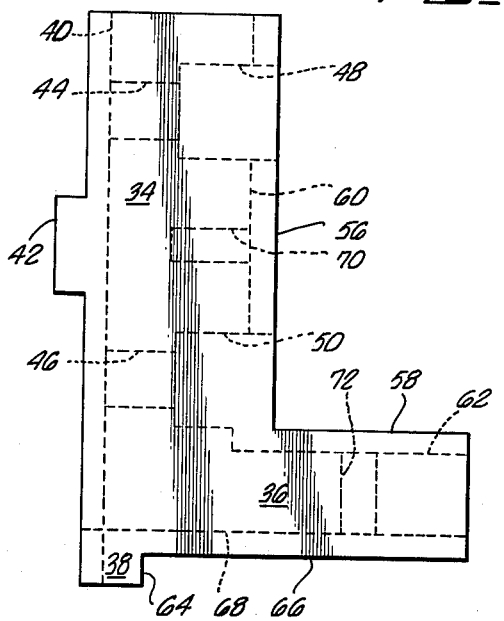
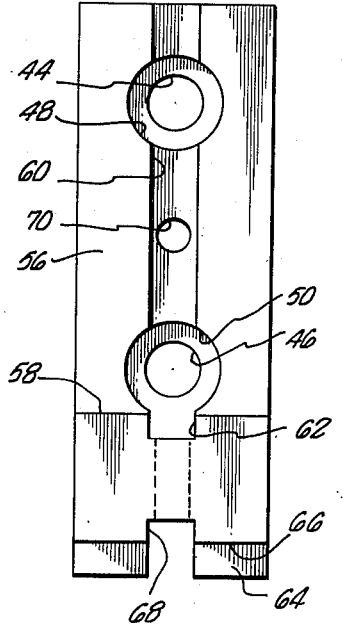
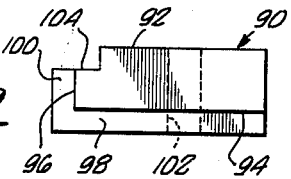
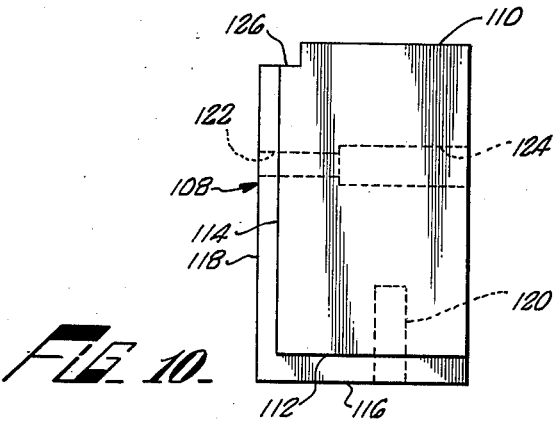
INVENTOR.
ERNEST J. TESTA
BY
Fowler & Knobbe
ATTORNEYS.

3,190,666
HOLDER AND JAW INSERTS COMPRISING THE TOP JAW FOR A CHUCK

Ernest J. Testa, Whittier, Calif., assignor to Tesan Tool Manufacturing Company, Santa Fe Springs, Calif.
Filed Aug. 6, 1963, Ser. No. 300,314
11 Claims. (Cl. 279—123)

This invention relates to top jaws for a chuck, such as the chuck of a lathe which has a plurality of master jaws to which top jaws are detachably mounted for gripping and holding a work-piece as it is turned or machined. More specifically, the present invention is concerned with the construction of a holder and an insert which together define the top jaw for a chuck.

Standard one-piece top jaws of hardened steel are quite limited in their work holding capabilities and, due to their hardness, they are not easily reworked to a different configuration than their original form. Hence, standard one-piece top jaws of unhardened steel, called soft top jaws, are provided, which can be machined to a special configuration to hold a particular work-piece in a manner that the hard top jaws do not readily provide. Soft top jaws are specially subject to wear but, whether soft or hard, unwanted eccentricity in holding a work-piece develops when the jaws become worn, or the chuck itself becomes worn, or a combination of both conditions develops. Also, it is impractical to inventory a sufficient variety of one-piece top jaws to meet all or nearly all work holding requirements.

A certain amount of versatility is gained from employing swivel type top jaws, for example similar to those shown in U.S. Patent No. 2,815,959; but these are relatively complicated and expensive, have wear problems and tend to score the work.

A holder with detachable inserts in accordance with the present invention provides a simple yet unique compromise in competing design characteristics. The holder, which is of hardened steel, is mounted on the master jaw of a chuck. Being hardened, the holder resists wear and has a long life. Either hard or soft inserts may be detachably mounted on the holder for engaging a work-piece. Due to the various configurations available from mounting inserts on the holder, a procedure which is much easier than mounting different one-piece top jaws, great flexibility is provided in work holding capabilities. The inserts are relatively inexpensive, making a substantial inventory of them and their replacement practical. Unwanted eccentricity can be corrected, or desired eccentricity can be added, by shimming between the inserts and holder or by selectively removing stock from the mounting faces of individual inserts as required.

A top jaw constructed in accordance with the invention comprises a holder having first and second mounting surfaces disposed perpendicular to one another, and means for securing the holder on the jaw of a chuck so that one of the holder mounting surfaces extends parallel and the other perpendicular to the axis of the chuck. Included in combination is a jaw insert having first and second perpendicular mounting surfaces which mate respectively with the first and second mounting surfaces of the holder, and means for detachably securing the jaw insert on the holder with said mating surfaces in engagement. In one embodiment of the invention, the holder is of relatively hard material and the insert is of relatively soft material, so as to provide a combined hard-soft top jaw; and, a lug and recess is formed between the mating surfaces of the holder and insert.

A specific form of holder embodying the invention comprises a body substantially in the form of a boot having an upright leg with a shoe extending forward at a right angle from the leg adjacent one end thereof and a heel extending downward from the rear of the shoe. The leg has a flat centrally grooved front surface, with the heel having a flat front surface parallel to the leg surface, and with the shoe having parallel top and bottom centrally grooved surfaces respectively intersecting said leg surface and heel surface at right angles. An upright bore extends through the shoe in registry with the grooves in its top and bottom surfaces, and facilitates securing a tongued jaw insert against the intersection of either of said intersecting leg and shoe surfaces and said intersecting shoe and heel surfaces.

A specific jaw insert constructed in accordance with the invention comprises a block having a top chucking surface, a bottom mounting face disposed generally parallel to the chucking surface, and an end mounting face disposed perpendicular to and extending between the bottom mounting face and the top chucking surface. A tongue extends along the bottom mounting face and is oriented perpendicular to the end mounting face, and a threaded bore extends perpendicular to the bottom mounting face and through the tongue.

Referring now to the accompanying drawings:

FIG. 3 is a sectional elevation taken along line 3—3 of FIG. 1;

FIG. 4 is a sectional elevation of a second of the inserts of FIG. 2 mounted on the holder;

FIG. 5 is a sectional elevation of a third of the inserts of FIG. 2 mounted on the holder;

FIG. 6 is a rear elevation of the holder;

FIG. 7 is a side elevation of the holder;

FIG. 8 is a front elevation of the holder;

FIG. 9 is a side elevation of the third insert illustrated in FIGS. 2 and 5; and FIG. 10 is a side elevation of the second insert illustrated in FIGS. 2 and 4.

Figure 1:
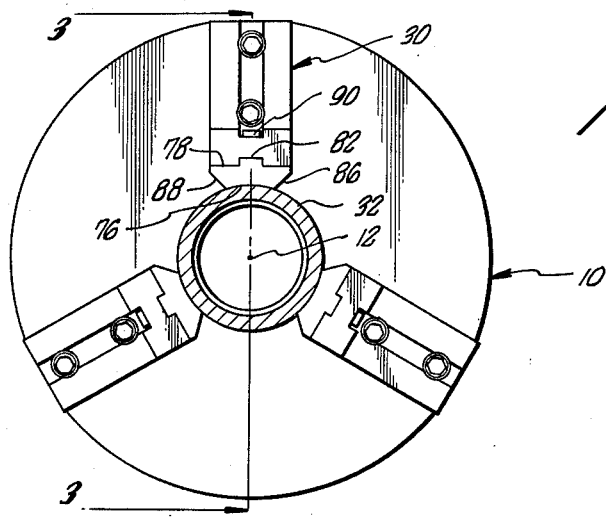
FIG. 1 is a front elevation of a chuck having three jaws, the jaws being outfitted with holders in accordance with the invention, with a first form of insert detachably mounted on the holders.

As can be seen from FIGS. 1 and 3, a lathe chuck 10 may have three master jaws adjustable radially with respect to the axis 12 of the chuck by means of screws. For example, a master jaw 14 is slidably engaged on a way 16 and threadably engaged by a screw 18, the screw being mounted in the chuck and radially restrained therein by projections 20. The master jaw 14 has a tongue 22, groove 24 and a pair of threaded bores 26, 28 accessible on its front face for mounting thereon a top jaw 30. The top jaw engages the work 32 to be machined. In accordance with the present invention, this top jaw is separated into a holder and detachable inserts.

Figure 2:
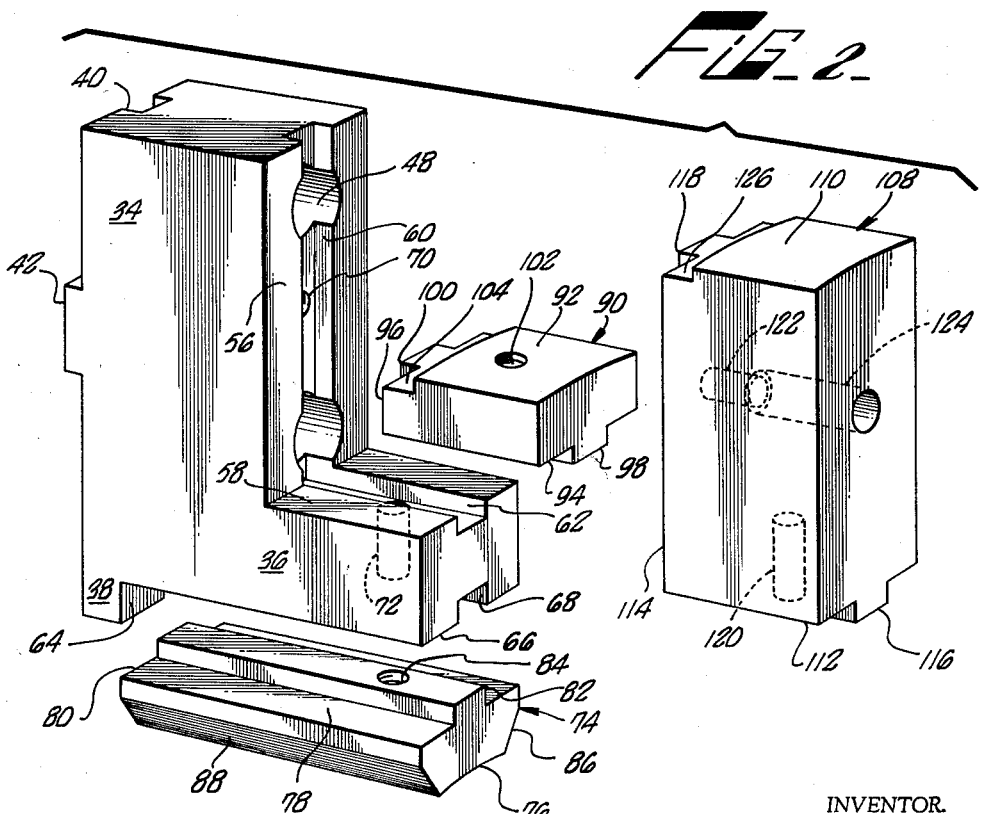
FIG. 2 is a perspective view of a holder and of first, second and third form of jaw inserts arranged about the holder in a fashion illustrating how they alternatively fit onto the holder.

As shown in FIGS. 2, 3 and 6–8, the holder for top jaw inserts is substantially in the form of a boot having an upright leg or base 34, a shoe 36 extending forward at a right angle from adjacent the lower end of the leg, and a heel 38 extending downward from the rear end of the shoe (FIGS. 2 and 7). The rear side of the leg 34 has an upright central groove 40 therein and a transverse tongue 42 thereon bisected by the groove. A pair of spaced smooth bores 44, 46 extend at a right angle through the leg, and open in the bottom of the groove 40 on the rear side of the leg. These bores 44, 46 communicate with enlarged counter-bores 48, 50 respectively which open through the front side of the leg so as to receive the heads of a pair of machine screws 52, 54 (FIG. 3).

The machine screws 52, 54 detachably mount the holder on the front face of the master jaw 14. The groove 40 and tongue 42 on the rear face of the leg 34 of the holder mate with the tongue 22 and groove 24 on the front face of the master jaw 14, thereby securely locking the position of the holder on the master jaw. The tongue, groove and threaded bores on the front face of the master jaw, as illustrated in FIG. 3, are conventional. The holder has correspondingly matching features on its rear side for mounting it so that the leg 34 of the holder extends radially and perpendicular to the chuck axis 12, with the shoe 36 of the holder extending forward therefrom parallel to the chuck axis 12. It will be noticed that the mounting permits of reversibility; that is, the holder can be turned upside down and mounted on the master jaw so that the shoe 36 of the holder is at the top instead of at the bottom.

The holder has first and second flat mounting surfaces 56, 58 intersecting at a right angle, these mounting surfaces being respectively the front surface of the leg 34 and the top surface of the shoe 36. The front leg surface 56 is bisected by a rectangular groove 60 which extends vertically along the center thereof and which is aligned with a similar groove 62 which extends longitudinally of and centrally divides the upper surface of the shoe.

A second set of flat mounting surfaces 64, 66, which intersect at a right angle, comprise the front upright surface of the heel 38 and the bottom surface of a shoe 36. The front heel surface 64 and the bottom shoe surface 66 extend respectively parallel to the front leg surface 56 and top shoe surface 58. A longitudinal rectangular groove 68 is formed centrally in the bottom surface 66 of the shoe, bisecting this surface and extending as well through the heel 38. To assist in mounting jaw inserts on the holder, a threaded bore 70 extends at a right angle into the leg 34 from the bottom of the upright groove 60 in the front leg surface 56, and a smooth upright bore 72 extends through the shoe 36 in registry with the aligned grooves 62, 68 in the top and bottom surfaces 58, 66 of the shoe.

When the holder is mounted on a master jaw 14, as shown in FIGS. 1 and 3, whether with the shoe at the top or with the shoe at the bottom (as shown), it will be seen that the center of the bores 44, 46, 48, 50, 70, 72 and the center of the grooves 60, 62, 68 lie in a plane containing the chuck axis 12, with the front or mounting surfaces 56, 64 respectively of the leg and heel disposed perpendicular to the chuck axis 12, and with the top and bottom mounting surfaces 58, 66 respectively of the shoe disposed parallel to the chuck axis 12.

One form of jaw insert, illustrated in FIGS. 1, 2 and 3, is especially useful for chucking the outside diameter of relatively small objects to be machined, such as the cylindrical piece of work 32. This jaw insert 74 has a top chucking surface 76, a bottom mounting face 78 disposed parallel to the chucking surface, an end mounting face 80 disposed perpendicular to and extending between the bottom mounting face and the top chucking surface, a tongue 82 extending along the bottom mounting face 78 and oriented perpendicular to the end mounting face 80, and a threaded bore 84 extending perpendicular to the bottom mounting face and through the tongue 82. Also, this insert has opposite side surfaces 86, 88 which converge toward the top chucking face 76 so that, as can be seen in FIG. 1, the jaw insert may approach closely to similar raw inserts in order to hold a piece of work of very small diameter.

The first form of jaw insert 74 is mounted on the holder by means of a machine screw 90 which extends through the smooth bore 72 in the shoe of the holder and engages the threaded bore 84 in the insert. The bottom and end mounting faces 78, 80 of the insert mate respectively with the intersecting mounting faces 66, 64 of the shoe and heel of the holder, with the tongue 82 and the groove 68 forming a lug and recess between the mating surfaces 66, 78 which lock them together in the direction tangential to the work 32.

A second form of jaw insert is illustrated in FIGS. 2, 5 and 9. This jaw insert 90 has a top chucking surface 92, a bottom mounting face 94 disposed parallel to the chucking surface, an end mounting face 96 disposed perpendicular to and extending between the bottom mounting face and the top chucking surface, a first tongue 98 extending along the bottom mounting face and oriented perpendicular to the end mounting face, a second tongue 100 extending along said end mounting face and orineted perpendicular to said bottom mounting face, and a threaded bore 102 extending perpendicular to the bottom mounting face and through said first tongue. This second form of jaw insert 90 has a recess 104 extending completely across the chucking surface adjacent the end mounting face. The recess 104 permits the chucking surface 92 of the insert to be machined after mounting, without running the machining tool into the front face 56 of the leg 34 of the holder.

The second form of jaw insert 90 is mounted on the holder by means of a machine screw 106 which extends through the smooth bore 72 in the shoe 36 of the holder and engages the threaded bore 102 in the insert 90. This draws the bottom and end mounting surfaces 94, 96 of the insert 90 against the intersecting mounting surfaces 58, 56 of the holder respectively, as well as engages the first and second tongues 98, 100 of the insert with the grooves 62, 60 of the holder.

A third form of insert 108 is illustrated in FIGS. 2, 4 and 10. This insert has a top chucking surface 110, a bottom mounting face 112 disposed parallel to the chucking surface, an end mounting face 114 disposed perpendicular to and extending between the bottom mounting face and the top chucking surface, a first tongue 116 extending centrally along the bottom mounting face and oriented perpendicular to the end mounting face, a second tongue 118 extending centrally along the end mounting face and oriented perpendicular to the bottom mounting face, and a threaded bore 120 extending perpendicular to the bottom mounting face and through said first tongue. Also, this insert has a smooth bore 122 and an axially aligned communicating counter-bore 124 which extend from the second tongue 118 of the end mounting face parallel to the bottom mounting face and through the body of the insert. A relief 126, for the same purpose as the relief 104 in the second form of insert, extends completely across the chucking surface 110 of the third form of insert, adjacent where the chucking surface would otherwise intersect the end mounting face 114 thereof.

Due to its increased height, the third form of jaw insert is mounted with two machine screws, a first screw 128 which extends through smooth bore 72 in the shoe of the holder to engage the threaded bore 120 opening through the first tongue of the insert, and a second machine screw 130 (shown in section in FIG. 4) which extends through the smooth bore 122 in the insert to engage the threads of the threaded bore 70 (FIG. 1) in the holder. In the mounted position, the perpendicular mounting surfaces 112, 114 of the insert engage the intersecting perpendicular mounting surfaces 58, 56 of the holder, with the first and second tongues 116, 118 of the insert engaging the respective grooves 62, 60 in the shoe and leg of the holder.

The holder is machined from stock steel in its natural condition and then processed through a conventional heat treating operation to harden it, hence making it more durable and wear resistant. The inserts may be fabricated in the same manner. However, there are many occasions when this is not desirable and such occasions especially demonstrate certain of the advantages of the invention. For example, relatively soft inserts would be used when a small lot of parts are to be run and wear on the inserts would not be a problem, or when the parts to be run must be free from disfigurement.

Relatively soft inserts may be made from steel, aluminum, brass, nylon, etc. With a relatively soft insert there is little wear on the holder so that it may be retained on the master jaws of the chuck almost indefinitely and different runs may be accomplished merely by replacing the inserts on the holder as necessary and desirable. This may be contrasted with the employment of a conventional one-piece top jaw of relatively soft material which is more difficult and time consuming to mount and demount (the requirement for mounting and demounting often being more frequent than is otherwise the case) and which is an expensive item to discard.

As is apparent from FIGS. 1 and 2, the chucking surface 76 of the first form of insert 74 is machined to exactly fit the contour of the work 32 thereby to insure the best gripping action of the insert on the work. The reliefs 104, 126 formed on the second and third forms of inserts 90, 108 facilitate such machining after mounting by providing a gap between the chucking surface and the face 56 of the leg of the holder so that the chucking surface of the insert remains a free surface with no ledges and yet the cutting tool does not engage the face of the holder.

Aside from the fact that it is much easier to inventory a number of relatively inexpensive inserts than a number of one-piece conventional top jaws, it will also be appreciated that the invention affords additional versatility as a consequence of the variety of ways in which inserts may be mounted on the holder. The first form of insert 74 which mounts against the heel 38 and bottom of the shoe 36 is primarily used for engaging the outer diameter of a work piece. The second and third form of inserts 90, 108, like the first form 74, may come in varying heights, but are primarily used to engage the inner circumference of a hollow piece of work, usually a hollow cylinder. By mounting the holder upside down from the position in FIG. 3 so that the shoe 36 is at the top, it will be appreciated that with a given stock of inserts and with a limited degree of radial travel of the master jaw 14, the first form of insert 74 may be employed to engage the inner circumference of large hollow cylindrical members, and the second and third form of inserts 92, 108 may be used to engage the outer diameter of a work piece.

I claim:

1. A top jaw for a chuck, comprising a holder having first and second mounting surfaces disposed perpendicular to one another, means for securing the holder on the jaw of a chuck so that the first holder mounting surface is disposed parallel and the second mounting surface is disposed perpendicular to the axis of the chuck, a jaw insert having first and second perpendicular mounting surfaces which mate respectively with the first and second mounting surfaces of the holder so as to form a pair of mating first surfaces and a pair of mating second surfaces, at least one pair of said mating surfaces having a mating lug and recess formed therebetween, said jaw insert having a chucking surface on a side opposite said first mounting surface, and means for detachably securing the jaw insert on the holder with said pairs of mating surfaces in engagement.

2. A top jaw for a chuck, comprising a holder having first and second mounting surfaces disposed perpendicular to one another and each having a groove extending along it, means for securing the holder on the jaw of a chuck so that one of the holder mounting surfaces extends parallel and the other perpendicular to the axis of the chuck with the grooves oriented parallel to a plane containing the chuck axis, a jaw insert having first and second mounting surfaces which mate respectively with those of the holder, the first and second mounting surfaces of the jaw insert each having a tongue extending along it which mates with the groove in the corresponding holder mounting surface, and means for detachably securing the jaw insert on the holder with said mating surfaces, tongues and grooves in engagement.

3. A holder for mounting jaw inserts of a top jaw for a chuck, comprising an upright base and a shoe extending forward from the base at a right angle, the base having a front mounting surface, the shoe having a mounting surface with a groove formed therein, the shoe mounting surface and groove extending perpendicular to the base mounting surface, the shoe also having an upright bore extending through it and registering with the bottom of said groove, and means for securing the rear side of the base to a chuck jaw so that the shoe extends forward and parallel to the chuck axis.

4. A holder for mounting jaw inserts to a top jaw for a chuck, comprising a body having a base and a shoe extending at a right angle to the base, means formed in the base for mounting the body on a chuck jaw so that the shoe extends forward and parallel to the chuck axis, the base having a mounting surface which is centrally grooved, the shoe having a centrally grooved mounting surface which intersects said base surface at a right angle, and means formed in the body for securing a jaw insert against said intersecting grooved mounting surfaces.

5. Apparatus of claim 4 wherein the grooves in said mounting surfaces are rectangular and aligned, and wherein the means for mounting the body on a chuck includes a plurality of bores extending through the base in registry with said base groove, and wherein the means for securing a jaw insert against said intersecting groove mounting surfaces includes at least one bore extending through the shoe in registry with said shoe groove.

6. A holder for mounting jaw inserts of a top jaw for a chuck, comprising a body substantially in the form of a boot having an upright leg with a shoe extending at a right angle from the leg adjacent one end thereof, means formed in the leg for mounting the body on a chuck jaw so that the rear side of the leg abuts the chuck with the shoe extending forward and parallel to the chuck axis, a flat centrally grooved surface extending along the front side of the leg, a flat centrally grooved surface extending along the top side of the shoe and intersecting said leg surface at a right angle, and means for securing a jaw insert against said intersecting leg and shoe surfaces.

7. A holder for mounting jaw inserts on a top jaw for a chuck, comprising a body having an upright base and a shoe extending at a right angle to the base, means formed in the base for mounting the body on a chuck jaw so that the shoe extends forward parallel to the chuck axis, the base having a first mounting surface which is centrally grooved and extends above the shoe, the shoe having a centrally grooved first mounting surface which intersects the first mounting surface of the base at a right angle, the base having a second mounting surface which extends below the shoe, the shoe having a second mounting surface centrally grooved and intersecting the second mounting surface of the base at a right angle, and means formed in the body for securing a jaw insert against the intersection of either of said intersecting first surfaces and said intersecting second surfaces.

8. A holder for tongued jaw inserts of a top jaw for a chuck, comprising a body substantially in the form of a boot having an upright leg with a shoe extending forward at a right angle from the leg adjacent one end thereof and a heel extending downward from the rear of the shoe, the leg having a flat centrally grooved front surface, the heel having a flat front surface parallel to said leg surface, the shoe having parallel top and bottom centrally grooved surfaces respectively intersecting said leg surface and heel surface at right angles, and means including an upright bore extending through the shoe in registry with the grooves in said top and bottom shoe surfaces for securing a tongued jaw insert against the intersection of either of said intersecting leg and shoe surfaces and said intersecting shoe and heel surfaces.

9. A top jaw insert of relatively soft material adapted to be mounted in a holder attached to a chuck jaw comprising a block having a top chucking surface, a bottom mounting face disposed generally parallel to the chucking surface, an end mounting face disposed perpendicular to and extending between the bottom mounting face and the top chucking surface, a tongue extending along the bottom mounting face and oriented perpendicular to the end mounting face, a threaded bore extending perpendicular to the bottom mounting face and through said tongue and, a relief recess formed in the chucking surface adjacent said end mounting face to permit the machining of the entire chucking surface after said insert is mounted on the holder, without the machine tool injuriously contacting the holder.

10. A top jaw for a chuck comprising, in combination,
 (a) a holder having first and second mounting surfaces lying in inserting planes;
 (b) at least one of said mounting surfaces having a grooved formed in it;
 (c) means for securing said holder on the jaw of a chuck so that one of the holder mounting surfaces extends roughly perpendicular to the chuck axis and the groove formed in one of said mounting surfaces lies generally in a common plane with the chuck axis;
 (d) a jaw insert having a chucking surface and first and second mounting surfaces which mate with the mounting surfaces of said holder to dispose the chucking surface so that the holder acts as a back support for the jaw insert;
 (e) one of said jaw insert mounting surfaces having a tongue extending along it which mates with said groove; and,
 (f) means for detachably securing the jaw insert on the holder with said mounting surfaces and tongue and groove in engagement.

11. A top jaw for a chuck in accordance with claim 10 wherein said jaw insert is formed of a relatively soft material and has a relief formed in its chucking surface so that it can be machined after the insert is secured to said holder without injuring the mounting surfaces of said holder.

References Cited by the Examiner
UNITED STATES PATENTS

| | | | |
|---|---|---|---|
| 2,543,117 | 2/51 | Mackmann | 279—110 |
| 2,896,958 | 7/59 | Strauss | 279—123 |
| 2,905,477 | 9/59 | Buck | 279—123 |
| 2,950,117 | 8/60 | Walmsley | 279—123 |

ROBERT C. RIORDON, *Primary Examiner.*